United States Patent

Tokumoto et al.

(10) Patent No.: US 6,948,385 B2
(45) Date of Patent: Sep. 27, 2005

(54) ROTATIONAL ANGLE DETECTING APPARATUS AND TORQUE DETECTING APPARATUS

(75) Inventors: Yoshitomo Tokumoto, Nabari (JP); Mahito Shiba, Kashiwara (JP); Naoki Maeda, Kashihara (JP); Kenichi Kotaka, Fujiidera (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/444,899

(22) Filed: May 23, 2003

(65) Prior Publication Data

US 2003/0217607 A1 Nov. 27, 2003

(30) Foreign Application Priority Data

May 23, 2002 (JP) ........................................ 2002-149820

(51) Int. Cl.[7] ................................................ G01L 3/02
(52) U.S. Cl. ................................................. 73/862.334
(58) Field of Search ...................... 73/862.328, 862.326, 73/862.325, 862.333, 862.334, 862.335, 862.08; 324/208, 207.3; 318/432, 488

(56) References Cited

U.S. PATENT DOCUMENTS

| | | | | |
|---|---|---|---|---|
| 4,774,464 A | * | 9/1988 | Kubota et al. | 324/207.25 |
| 4,783,998 A | * | 11/1988 | Sander | 73/660 |
| 4,874,053 A | * | 10/1989 | Kimura et al. | 324/207.21 |
| 4,939,435 A | * | 7/1990 | Takahashi et al. | 318/432 |
| 4,996,657 A | | 2/1991 | Shiraishi et al. | |
| 5,019,776 A | * | 5/1991 | Kawamata et al. | 324/207.12 |
| 5,239,490 A | * | 8/1993 | Masaki et al. | 73/862.08 |
| 6,536,293 B2 | * | 3/2003 | Shiba | 73/862.193 |
| 2002/0039025 A1 | | 4/2002 | Shiba | |
| 2002/0124663 A1 | * | 9/2002 | Tokumoto et al. | 73/862.333 |

FOREIGN PATENT DOCUMENTS

| | | |
|---|---|---|
| EP | 1 087 218 A1 | 3/2001 |
| EP | 1 293 752 A1 | 3/2003 |
| JP | 2002-069121 | 3/2002 |
| WO | WO-01/42753 A1 | 6/2001 |

OTHER PUBLICATIONS

U.S. Appl. No. 20020039025, Published Apr. 4, 2002.

* cited by examiner

*Primary Examiner*—Edward Lefkowitz
*Assistant Examiner*—T Miller
(74) *Attorney, Agent, or Firm*—Darby & Darby (57) ABSTRACT

One or plural rotors are coaxially provided on a first shaft and a second shaft connected with each other by a connection shaft. Plural targets are provided at each rotor. Two detecting means disposed opposite to the targets output detection signals having phases different from each other as the rotor rotates. The steering apparatus assists steering according to a steering torque applied to the first shaft detected based on the detection signals and a steering angle of the first shaft. The steering apparatus has comparing means for comparing the detection signals with each other; malfunction judging means for judging whether any one of the detecting means is malfunctioning or not on the basis of a comparison result; and notifying means for notifying a malfunction when the malfunction judging means judges that there is a malfunction and can notify the driver of a malfunction in a torque sensor when it occurs.

6 Claims, 9 Drawing Sheets

ROTATIONAL ANGLE DETECTING APPARATUS AND TORQUE DETECTING APPARATUS

BACKGROUND OF THE INVENTION

1. Field of the Invention

The present invention relates to a rotational angle detecting apparatus and a torque detecting apparatus used in a steering apparatus, in which a first shaft connected with a steering member and a second shaft connected with a steering mechanism are connected with each other by a connection shaft, a rotor provided with one or a plurality of targets is coaxially provided at each of the first shaft and the second shaft, two detecting means disposed opposite to each target output detection signals having phases different from each other in accordance with each position of the target as the rotor rotates, a steering torque applied to the first shaft is detected on the basis of the detection signals respectively outputted from the detecting means and steering is assisted in accordance with the detected steering torque.

2. Description of Related Art

Known as one of steering apparatuses for automobiles is an electric power steering apparatus capable of reducing driver's load by driving an electric motor to assist steering. Such an electric power steering apparatus comprises an input shaft joined to a steering member (steering wheel), an output shaft connected to steerable wheels by a pinion and a rack or the like and a connection shaft for connecting the input shaft with the output shaft so as to detect, by a torque sensor, a steering torque applied to the input shaft on the basis of an angle of torsion generated at the connection shaft and to drive an electric motor for steering assist, which interlocks with the output shaft, in a controlled manner on the basis of the steering torque detected by the torque sensor.

The present applicant has suggested in Japanese Patent Application No. 2002-69121 a rotational angle detecting apparatus comprising one or a plurality of first targets provided at a rotor; first detecting means, disposed opposite to the first targets, for outputting a detection signal as the rotor rotates; second detecting means for outputting a detection signal having a phase different from that of the detection signal outputted from the first detecting means; second targets, provided at a rotor, the number of which is coprime with the number of the first targets; third detecting means, disposed opposite to the second targets, for outputting a detection signal as the rotor rotates; and fourth detecting means for outputting a detection signal having a phase different from that of the detection signal outputted from the third detecting means, wherein a rotational angle of the rotor is detected on the basis of the detection signals respectively outputted from the first detecting means, second detecting means, third detecting means and fourth detecting means. The application also suggests a torque detecting apparatus (torque sensor) comprising this rotational angle detecting apparatus and a steering apparatus comprising this torque detecting apparatus.

According to the conventional electric power steering apparatus, a steering assist operation stops when a malfunction is detected in the torque sensor. As a result, when a malfunction occurs in a torque sensor while the automobile is running, the malfunction prevents the driver from driving comfortably, without notifying the driver of what has happened. In a worst situation, there may arise a problem that resistance to the steering wheel increases while the automobile is running, it becomes impossible to operate the steering wheel appropriately and thereby it becomes impossible to move the vehicle for emergency evacuation.

BRIEF SUMMARY OF THE INVENTION

The present invention has been made with the aim of solving the above problems, and it is an object thereof to provide a steering apparatus capable of notifying the driver of a malfunction in a torque sensor, when it occurs, and a rotational angle detecting apparatus and a torque detecting apparatus to be used in the steering apparatus.

Another object of the present invention is to provide a steering apparatus capable of continuing steering assist as long as possible as well as notifying the driver of a malfunction in a torque sensor, when it occurs, and a rotational angle detecting apparatus and a torque detecting apparatus to be used in the steering apparatus.

Still another object of the present invention is to provide a steering apparatus which allows the driver to select whether or not a steering assist is to be continued as long as possible when a malfunction occurs in a torque sensor, and a rotational angle detecting apparatus and a torque detecting apparatus to be used in the steering apparatus.

A rotational angle detecting apparatus for detecting a rotational angle of a first rotor, according to the present invention, comprises first targets provided at the first rotor; second targets provided at a second rotor rotating coaxially with the first rotor; two detecting means, disposed opposite to the first targets, for outputting detection signals having phases different from each other in accordance with each position of the first targets as the first rotor rotates; and two detecting means, disposed opposite to the second targets, for outputting detection signals having phases different from each other in accordance with each position of the second targets as the second rotor rotates. The rotational angle detecting apparatus further comprises comparing means for comparing the detection signals with each other; malfunction judging means for judging whether any one of the detecting means is malfunctioning or not on the basis of a comparison result of the comparing means; and notifying means for notifying a malfunction when the malfunction judging means has judged that there is a malfunction.

A torque detecting apparatus according to the present invention detects a torque applied to a first shaft or a second shaft connected with the first shaft by a connection shaft. The torque detecting apparatus comprises a first rotor coaxially provided on the first shaft; a second rotor coaxially provided on the second shaft; first targets provided at the first rotor; second targets provided at the second rotor; two detecting means, disposed opposite to the first targets, for outputting detection signals having phases different from each other in accordance with each position of the first targets as the first rotor rotates; and two detecting means, disposed opposite to the second targets, for outputting detection signals having phases different from each other in accordance with each position of the second targets as the second rotor rotates. The torque detecting apparatus further comprises comparing means for comparing the detection signals with each other; malfunction judging means for judging whether any one of the detecting means is malfunctioning or not on the basis of a comparison result of the comparing means; and notifying means for notifying a malfunction when the malfunction judging means has judged that there is a malfunction.

A steering apparatus according to the present invention is provided with a first shaft connected with a steering member and a second shaft connected with a steering mechanism, which are connected with each other by a connection shaft. Each of the first shaft and the second shaft is provided with one or a plurality of rotors which are fitted coaxially. Each of the rotors is provided with one or a plurality of targets. Two detecting means disposed opposite to the targets output detection signals having phases different from each other in accordance with each position of the targets as the rotor rotates. The steering apparatus detects a steering torque applied to the first shaft and a steering angle of the first shaft or the second shaft on the basis of the detection signals respectively outputted from the detecting means and assists steering in accordance with the detected steering torque and steering angle. The steering apparatus further comprises comparing means for comparing the detection signals with each other; malfunction judging means for judging whether any one of the detecting means is malfunctioning or not on the basis of a comparison result of the comparing means; and notifying means for notifying a malfunction when the malfunction judging means has judged that there is a malfunction.

The comparing means of the steering apparatus compares the detection signals with each other and the malfunction judging means judges whether any detecting means is malfunctioning or not on the basis of a comparison result of the comparing means. The notifying means notifies a malfunction when the malfunction judging means has judged that there is a malfunction.

Such a structure can realize a steering apparatus capable of notifying the driver of a malfunction in a torque sensor when it occurs.

In the steering apparatus according to the present invention, the comparing means may be constructed to correct one of detection signals outputted from two detecting means on the basis of the difference in the phases of the detection signals and to compare the corrected detection signal with the other detection signal.

This steering apparatus can judge whether any detecting means is malfunctioning or not and notify the driver of a malfunction in the torque sensor when it occurs.

The steering apparatus according to the present invention may further comprise means for deciding, when the malfunction judging means has judged that there is a malfunction in any one of the detecting means, whether or not to stop steering assist in accordance with the detecting means which is judged to be malfunctioning. In this case, the notifying means applies vibration to the steering assist when the deciding means has decided not to stop the steering assist.

Such a structure can realize a steering apparatus capable of continuing steering assist as long as possible as well as notifying the driver of a malfunction in the torque sensor when it occurs.

The steering apparatus according to the present invention may further comprise steering angle steering means for assisting steering in accordance with a detected steering angle when the malfunction judging means has judged that a malfunction is in detecting means which is not involved in detection of the steering angle.

Since the steering angle steering means assists steering in accordance with a detected steering angle when the malfunction judging means has judged that a malfunction is in detecting means which is not involved in detection of the steering angle, the steering apparatus can continue steering assist as long as possible as well as notify the driver of a malfunction in the torque sensor when it occurs.

The steering apparatus according to the present invention may further comprise a switch for selecting on or off of the steering angle steering means.

With the steering apparatus wherein the switch selects on or off of the steering angle steering means, the driver can select whether or not to continue the steering assist as long as possible when a malfunction occurs in a torque sensor.

A rotational angle detecting apparatus for detecting a rotational angle of a first rotor, according to the present invention, comprises first targets provided at the first rotor; second targets provided at a second rotor rotating coaxially with the first rotor; two detecting means, disposed opposite to the first targets, for outputting detection signals having phases different from each other in accordance with each position of the first targets as the first rotor rotates; and two detecting means, disposed opposite to the second targets, for outputting detection signals having phases different from each other in accordance with each position of the second targets as the second rotor rotates. The rotational angle detecting apparatus further comprises calculating means for calculating the difference between a local maximal value and a local minimal value of each of the detection signals; comparing means for comparing the differences in the respective detection signals calculated by the calculating means with each other; and malfunction judging means for judging whether any one of the detecting means is malfunctioning or not on the basis of a comparison result of the comparing means.

A torque detecting apparatus according to the present invention detects a torque applied to a first shaft or a second shaft connected with the first shaft by a connection shaft. The torque detecting apparatus comprises a first rotor coaxially provided on the first shaft; a second rotor coaxially provided on the second shaft; first targets provided at the first rotor; second targets provided at the second rotor; two detecting means, disposed opposite to the first targets, for outputting detection signals having phases different from each other in accordance with each position of the first targets as the first rotor rotates; and two detecting means, disposed opposite to the second targets, for outputting detection signals having phases different from each other in accordance with each position of the second targets as the second rotor rotates. The torque detecting apparatus further comprises calculating means for calculating the difference between a local maximal value and a local minimal value of each of the detection signals; comparing means for comparing the differences in the respective detection signals calculated by the calculating means with each other; and malfunction judging means for judging whether any one of the detecting means is malfunctioning or not on the basis of a comparison result of the comparing means.

A steering apparatus according to the present invention is provided with a first shaft connected with a steering member and a second shaft connected with a steering mechanism, which are connected with each other by a connection shaft. Each of the first shaft and the second shaft is provided with a rotor which is fitted coaxially. Each of the rotors is provided with one or a plurality of targets. Two detecting means disposed opposite to the targets output detection signals having phases different from each other in accordance with each position of the targets as the rotor rotates. The steering apparatus detects a steering torque applied to the first shaft on the basis of the detection signals respectively outputted from the detecting means and assists steering in accordance with the detected steering torque. The steering apparatus further comprises calculating means for calculating the difference between a local maximal value and a local minimal value of each of the detection signals; comparing means for comparing the differences in the respective detection signals calculated by the calculating means with each other; and malfunction judging means for judging whether any one of the detecting means is malfunctioning or not on the basis of a comparison result of the comparing means.

The calculating means in the steering apparatus calculates the difference between the local maximal value and the local minimal value of each of the detection signals and the comparing means compares the differences in the respective detection signals calculated by the calculating means with each other. The malfunction judging means judges whether any one of the detecting means is malfunctioning or not on the basis of a comparison result of the comparing means.

Such a structure can realize a steering apparatus capable of notifying the driver of a malfunction in the torque sensor when it occurs.

The above and further objects and features of the invention will more fully be apparent from the following detailed description with accompanying drawings.

DETAILED DESCRIPTION OF THE INVENTION

The following description will explain the present invention with reference to the drawings illustrating an embodiment thereof.

Figure 1:
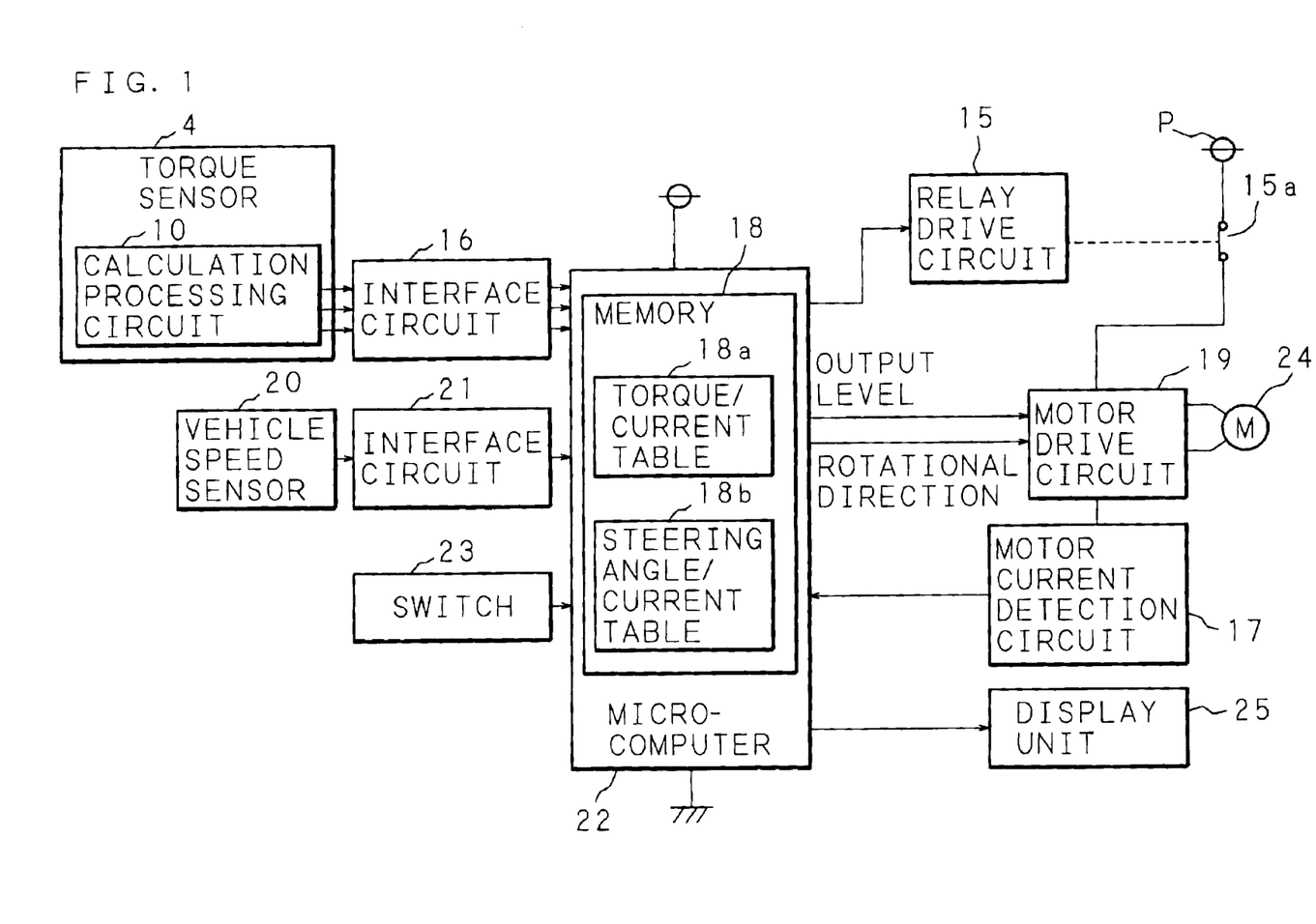
FIG. 1 is a block diagram showing the structure of a main part of an electric power steering apparatus according to the present invention.

FIG. 1 is a block diagram showing the structure of a main part of an electric power steering apparatus according to the present invention. In the electric power steering apparatus, a torque value, an absolute steering angle and a malfunction signal, when a malfunction occurs, detected by a torque sensor 4 (torque detecting apparatus) for detecting a torque applied to a steering shaft (not illustrated in the figure) are supplied from a calculation processing circuit 10 of the torque sensor 4 via an interface circuit 16 to a microcomputer 22. The microcomputer 22 causes a display unit 25 to display a notice that a malfunction has occurred, when a malfunction signal is supplied.

The microcomputer 22 is supplied with an on/off signal of a switch 23 for selecting whether or not to perform steering assist according to an absolute steering angle detected by the torque sensor 4, in place of steering assist according to a torque, when a malfunction occurs in a part of the torque sensor 4.

A detection signal outputted from a vehicle speed sensor 20 for detecting a vehicle speed is supplied to the microcomputer 22 via an interface circuit 21.

A relay control signal outputted from the microcomputer 22 is inputted to a relay drive circuit 15, so that the relay drive circuit 15 turns on or off a fail-safe relay 15a in response to the relay control signal.

Referring to a torque/current table 18a in a memory 18, the microcomputer 22 generates a motor control signal on the basis of a torque value, a vehicle speed, an absolute steering angle, and a motor current which will be described later. The generated motor control signal (output level and rotational direction) is supplied to a motor drive circuit 19. On the basis of the supplied motor control signal, the motor drive circuit 19 drives a steering assist motor 24 to rotate.

The memory 18 further stores a steering angle/current table 18b to be used for assisting steering in accordance with an absolute steering angle detected by the torque sensor 4, as mentioned above, when a malfunction has occurred in a part of the torque sensor 4.

A motor current of the steering assist motor 24 flowing through the motor drive circuit 19 is detected by a motor current detection circuit 17 and the detection result is supplied to the microcomputer 22.

Figure 2:
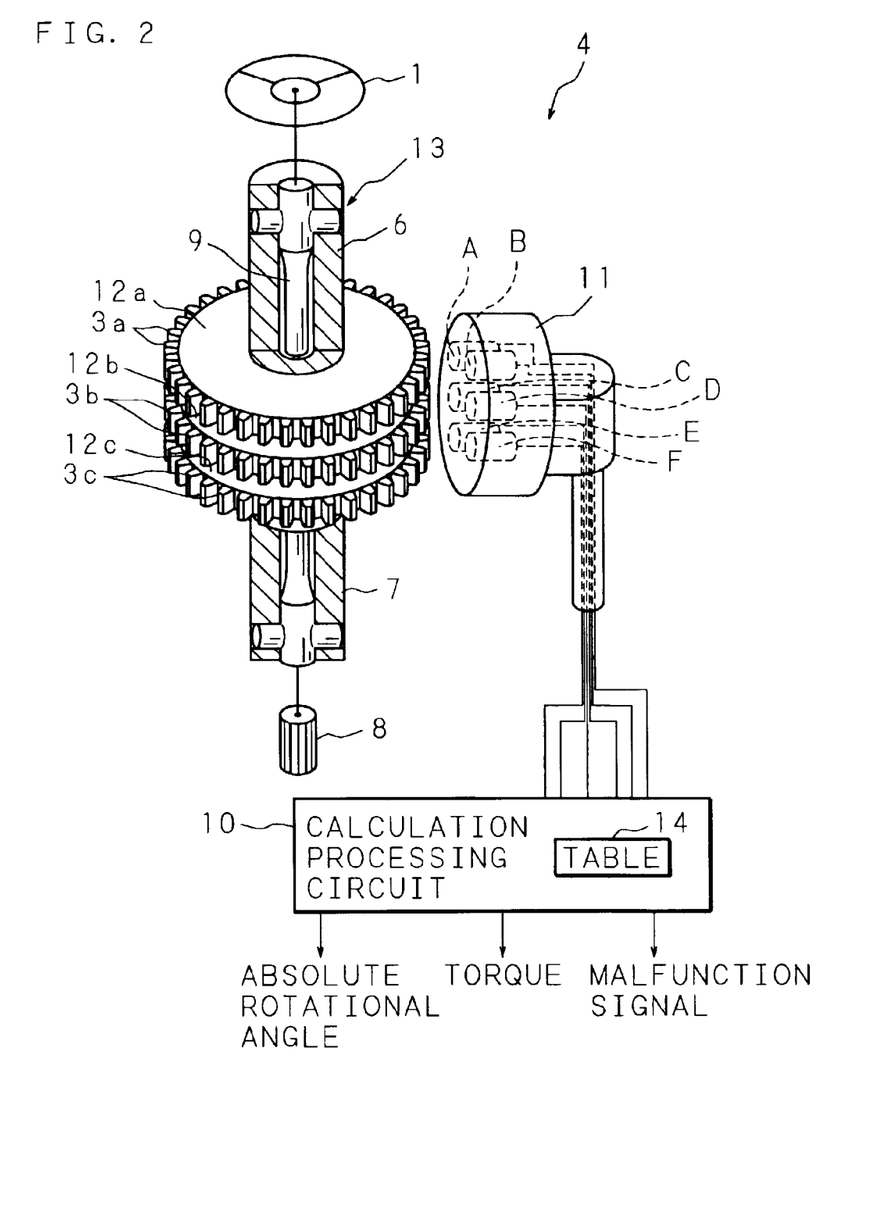
FIG. 2 is a schematic view schematically showing an example of the structure of a torque sensor.

FIG. 2 is a schematic view schematically showing an example of the structure of the torque sensor 4. In the torque sensor 4, an input shaft 6 (rotor, first shaft) having an upper end connected with a steering member 1 (steering wheel) and an output shaft 7 (rotor, second shaft) having a lower end connected with a pinion 8 of a steering mechanism are coaxially connected with each other via a torsion bar 9 (connection shaft) of a small diameter, so as to compose a steering shaft 13 which couples the steering wheel 1 and the steering mechanism. The portions of the input shaft 6 and the output shaft 7 where the two shafts are joined to each other are constructed as described hereinafter.

A disk-shaped target plate 12a is coaxially fitted on a portion of the input shaft 6 in the vicinity of the end which is joined with the output shaft 7. On the peripheral surface of the target plate 12a, thirty four, for example, targets 3a configured as protrusions made of magnetic material are projected at regular intervals in a circumferential direction. Each target 3a is configured as a tooth of a spur gear. The annular spur gear composes the target plate 12a and the targets 3a.

Disk-shaped target plates 12b and 12c (rotors) are coaxially fitted on portions of the output shaft 7 in the vicinity of the end which is joined with the input shaft 6, with the target plate 12b positioned closer to the input shaft 6. On the peripheral surface of the target plate 12c, the same number of targets 3c as the targets 3a, i.e. thirty four targets 3c, configured as protrusions made of magnetic material are projected at regular intervals as aligned with the targets 3a in a circumferential direction. On the peripheral surface of the target plate 12b, targets 3b the number of which is coprime with the number of the targets 3c, thirty three targets 3b for example, configured as protrusions made of magnetic material are projected at regular intervals in a circumferential direction. Here, to be coprime means that the two numbers have no common divisor except 1.

Each of the targets 3b and 3c is configured as a tooth of a spur gear. The annular spur gears compose the target plates 12b and 12c and the targets 3b and 3c.

A sensor box 11 is disposed outside the target plates 12a, 12b and 12c to face the outer edges of the targets 3a, 3b and 3c which are provided respectively at the periphery of the target plates. The sensor box 11 is fixedly supported at an immovable part of a housing (not illustrated in the figure) for supporting the input shaft 6 and the output shaft 7, or the like. The sensor box 11 houses magnetic sensors A and B (detecting means) opposing positions different from each other in the circumferential direction of the targets 3a on the input shaft 6 and magnetic sensors E and F (detecting means) opposing positions different from each other in the circumferential direction of the targets 3c on the output shaft 7 with the positions thereof in the circumferential direction aligned appropriately. The sensor box 11 also houses magnetic sensors C and D (detecting means) opposing positions different from each other in the circumferential direction of the targets 3b on the output shaft 7.

Each of the magnetic sensors A, B, C, D, E and F consists of an element, such as a magnetoresistance effect element (MR element), having an electric characteristic (resistance) which changes by the action of a magnetic field, whereby the detection signal changes in accordance with a change in an adjacent portion of the target 3a, 3b or 3c which the magnetic sensor opposes. The detection signals of the magnetic sensors A, B, C, D, E and F are supplied to the calculation processing circuit 10 consisting of a microprocessor provided outside or inside the sensor box 11.

Incorporated in the calculation processing circuit 10 is a table 14 which stores rotational angles of the output shaft 7 in rotation in correspondence to values of the respective detection signals measured by the magnetic sensors C, D, E and F.

The magnetic sensors A, B, C, D, E and F output detection signals having substantially sinusoidal waveforms as the respective targets 3a, 3b and 3c pass by. Although the nonlinear rate of change in each of the detection signals becomes the maximum value in the vicinity of a point where a change in the value turns from rise to fall or from fall to rise, the detection signals can be complemented by the following signal processing method.

Figure 3A:
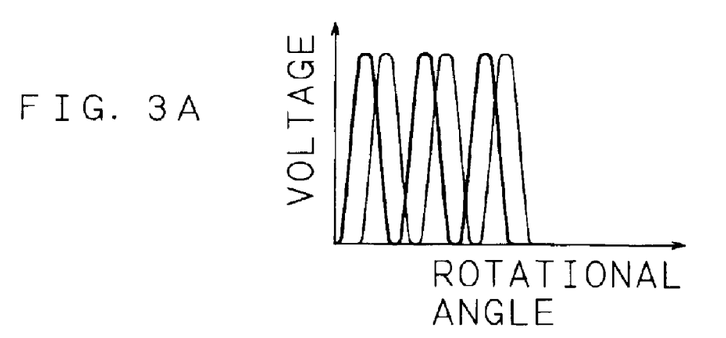
FIGS. 3A through 3C are wave form charts showing examples of detection signals of magnetic sensors.
Figure 3B:
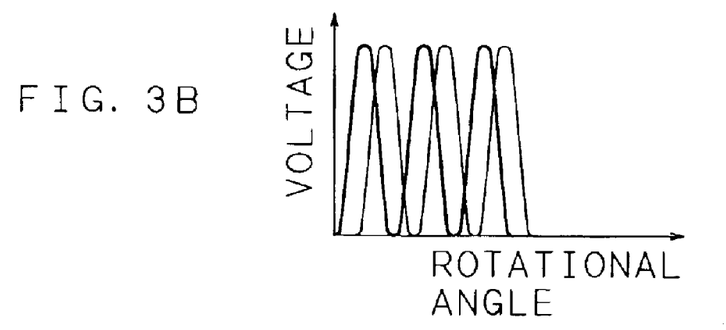
Figure 3C:
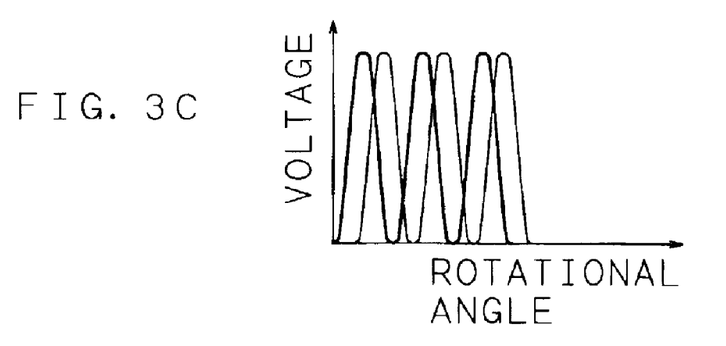

In the torque sensor 4 constructed as above, as shown in FIGS. 3A, 3B and 3C, each of the magnetic sensors A, B, C, D, E and F outputs a detection signal which rises and falls in accordance with a change in a rotational angle of the input shaft 6 or the output shaft 7 while the corresponding target 3a, 3b or 3c passes a position which the magnetic sensor opposes.

The detection signals of the magnetic sensors A and B correspond to the rotational angle of the input shaft 6 provided with the targets 3a corresponding to the magnetic sensors A and B. The detection signals of the magnetic sensors C and D correspond to the rotational angle of the output shaft 7 provided with the targets 3b corresponding to the magnetic sensors C and D. The detection signals of the magnetic sensors E and F correspond to the rotational angle of the output shaft 7 provided with the targets 3c corresponding to the magnetic sensors E and F.

In this manner, the calculation processing circuit 10 can calculate a relative rotational angle of the input shaft 6 on the basis of the detection signals of the magnetic sensors A and B. The calculation processing circuit 10 and the magnetic sensors A and B act as a rotational angle detecting apparatus of the input shaft 6. The calculation processing circuit 10 can also calculate a relative rotational angle of the output shaft 7 on the basis of the detection signals of the magnetic sensors E and F. The calculation processing circuit 10 and the magnetic sensors E and F act as a rotational angle detecting apparatus of the output shaft 7.

When torque is applied to the input shaft 6, a difference arises between the respective detection signals of the magnetic sensors A and B and the respective detection signals of the magnetic sensors E and F.

The magnetic sensors A and E and the magnetic sensors B and F are arranged to have phases different from each other by electrical angles of 90°, for example, in the circumferential direction of the target plates 12a and 12c. Although the nonlinear rate of change in each of the detection signals becomes the maximum value at the local maximal value and the local minimal value where a change in the value turns from rise to fall or from fall to rise, the detection signals which have phases different from each other can be complemented mutually. It should be understood that the difference in phase angles may be any electrical angle between 1° through 360° as long as complement can be achieved.

Here, the difference between the detection signal of the magnetic sensor A and the detection signal of the magnetic sensor E, or the difference between the detection signal of the magnetic sensor B and the detection signal of the magnetic sensor F, corresponds to the difference (relative angular displacement) between rotational angles of the input shaft 6 and the output shaft 7. The relative angular displacement corresponds to an angle of torsion generated at the torsion bar 9 connecting the input shaft 6 and the output shaft 7 by the action of torque applied to the input shaft 6. The torque applied to the input shaft 6 therefore can be calculated on the basis of the aforementioned difference between the detection signals.

Similarly to the magnetic sensor E and the magnetic sensor F, the magnetic sensor C and the magnetic sensor D are arranged to have phases different from each other by electrical angles of 90° in the circumferential direction of the target plate 12b. The number of the targets 3c opposing the magnetic sensors E and F is thirty four while the number of the targets 3b opposing the magnetic sensors C and D is thirty three. The magnetic sensors E and C and the magnetic sensors F and D therefore output detection signals which, as shown in FIG. 4, have phases to be shifted from each other by 1/34 phase for each rotation of the output shaft 7 of one phase.

Figure 4:
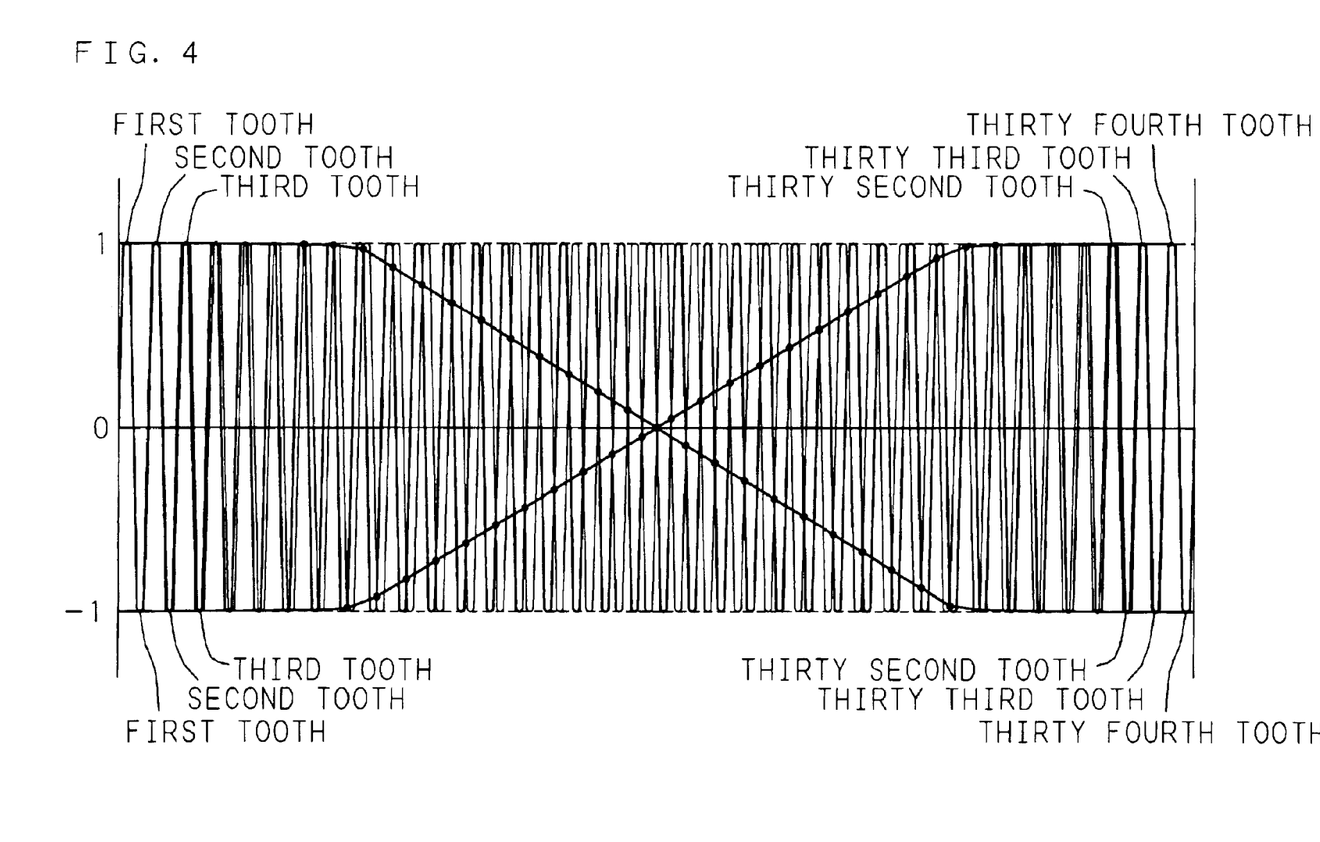
FIG. 4 is a wave form chart showing an example of detection signals of magnetic sensors opposing targets, the numbers of which are different from each other.

In a case where only the magnetic sensors E and C, or only the magnetic sensors F and D, are provided, the rotational angle (absolute rotational angle) of the output shaft 7 cannot be specified since one pair of detection signal values appear twice while the output shaft 7 makes a rotation of 360° as shown in FIG. 4. Referring the table 14, however, the rotational angle of the output shaft 7 can be specified on the basis of the values of the detection signals of the magnetic sensors E, C, F and D.

The following description will explain operations of the electric power steering apparatus constructed as above by referring to the flow charts in FIGS. 5 through 8 showing the operations.

Figure 5:
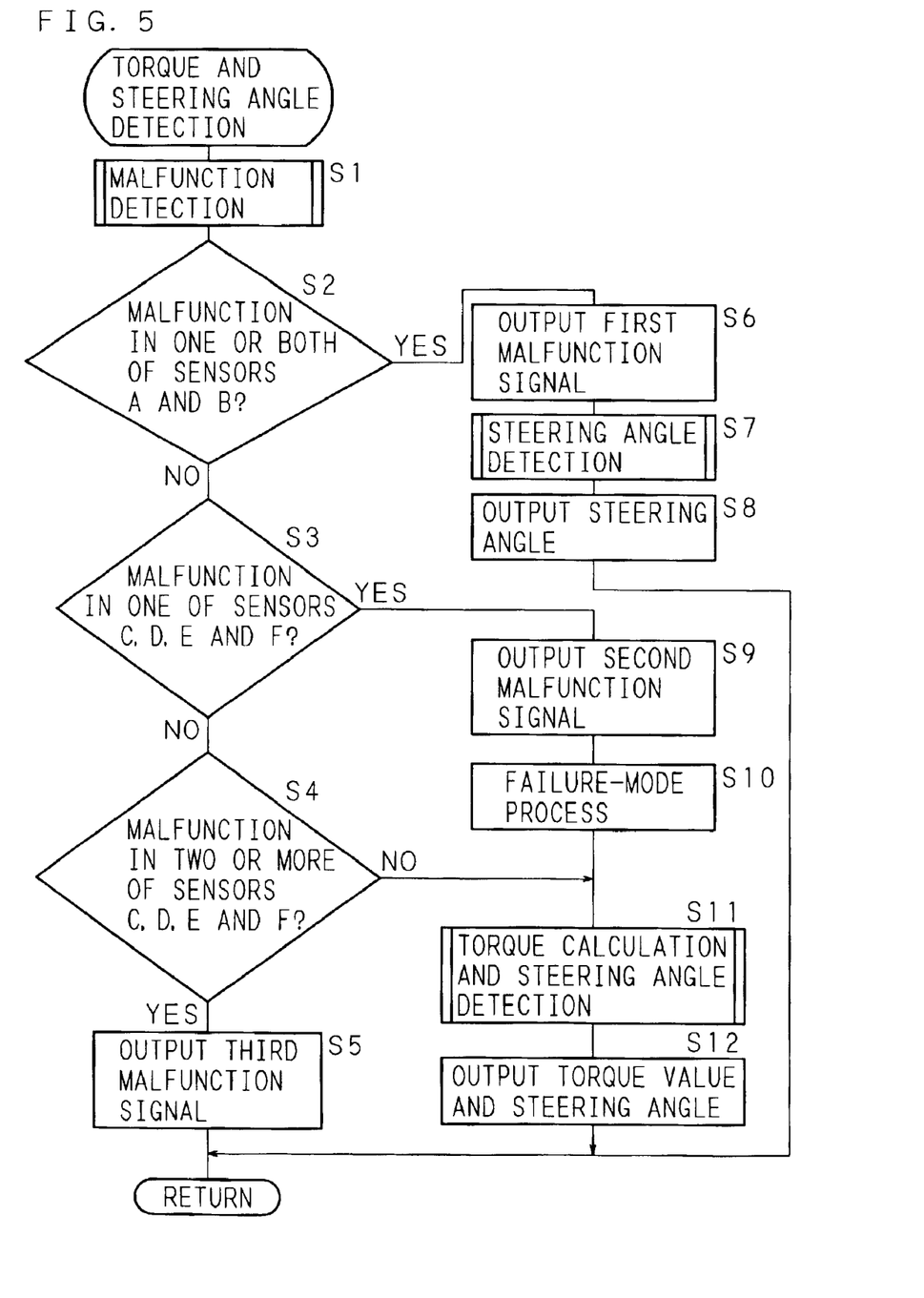
FIG. 5 is a flow chart showing an operation of a calculation processing circuit of an electric power steering apparatus according to the present invention.

In order to detect a torque and an absolute steering angle, the calculation processing circuit 10 first performs malfunction detection of the magnetic sensors A, B, C, D, E and F (step S1 in FIG. 5).

In malfunction detection of the magnetic sensors C, D, E and F, referring to the table 14, the calculation processing circuit 10 specifies in which magnetic sensor a malfunction has occurred by judging whether or not detection signals $C(\theta)$, $D(\theta)$, $E(\theta)$ and $F(\theta)$ of the magnetic sensors C, D, E and F satisfy the following relations:

$$C(\theta) \cong D(\theta-90°) \text{ (90° is an electrical angle)}$$

$$E(\theta) \cong F(\theta-90°) \text{ (90° is an electrical angle)}$$

$$C(\theta) \cong E(\theta \times (N-1)/N)$$

$$D(\theta) \cong F(\theta \times (N-1)/N)$$

where N=34.

Since each of detection signals of the magnetic sensors A and B can be approximated to be a sinusoidal waveform in malfunction detection of the magnetic sensors A and B, the calculation processing circuit 10 detects a malfunction in either one of the magnetic sensors A and B by judging whether or not the detection signals A(θ) and B(θ) of the magnetic sensors A and B satisfy the following relation:

$$A(\theta) \cong B(\theta-90°) \text{ (90° is an electrical angle)}$$

After performing malfunction detection of the magnetic sensors A, B, C, D, E and F in step S1, the calculation processing circuit 10 judges whether a malfunction has occurred in one or both of the magnetic sensors A and B or not (step S2). When a malfunction is detected in one or both of the magnetic sensors A and B (YES in step S2), the calculation processing circuit 10 outputs a first malfunction signal (step S6), then detects an absolute steering angle with the magnetic sensors C, D, E and F (step S7), outputs the absolute steering angle to the microcomputer 22 (step S8) and returns the procedure.

The calculation processing circuit 10 judges whether a malfunction has occurred in one of the magnetic sensors C, D, E and F or not (step S3). When a malfunction is detected in one of the magnetic sensors C, D, E and F (YES in step S3), the calculation processing circuit 10 outputs a second malfunction signal (step S9), then performs a failure-mode process without using a detection signal of a malfunctioning magnetic sensor (step S10), performs torque calculation and steering angle detection (step S11), outputs the detected torque value and absolute steering angle to the microcomputer 22 (step S12) and returns the procedure.

In the failure-mode process (step S10), the calculation processing circuit 10 obtains and compensates for the detection signal of the malfunctioning magnetic sensor using the relation represented by the above expressions of the respective detection signals C(θ), D(θ), E(θ) and F(θ) of the magnetic sensors A, B, C, D, E and F.

The calculation processing circuit 10 judges whether a malfunction has occurred in two or more of the magnetic sensors C, D, E and F or not (step S4). When a malfunction is detected in two or more of the magnetic sensors C, D, E and F (YES in step S4), the calculation processing circuit 10 outputs a third malfunction signal (step S5) and returns the procedure.

When no malfunction is detected in the magnetic sensors A, B, C, D, E and F (NO in step S4), the calculation processing circuit 10 performs torque calculation and steering angle detection (step S11), outputs the detected torque value and absolute steering angle to the microcomputer 22 (step S12) and returns the procedure.

Figure 6:
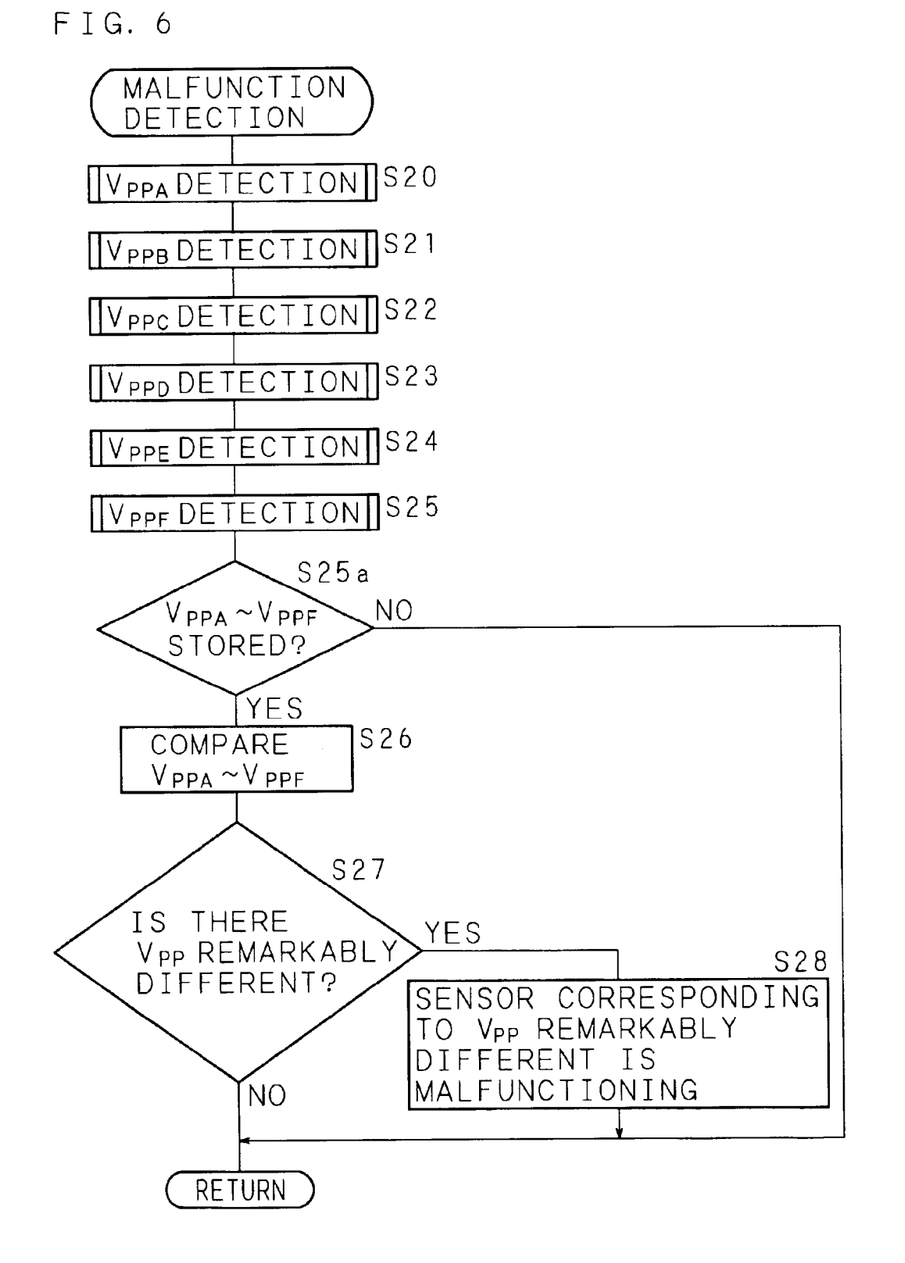
FIG. 6 is a flow chart showing an operation of a calculation processing circuit of an electric power steering apparatus according to the present invention.

For malfunction detection (step S1 in FIG. 5) of the magnetic sensors A, B, C, D, E and F, the calculation processing circuit 10 can employ the following method shown in a flow chart of FIG. 6 in place of the above-described method.

The calculation processing circuit 10 detects respective P—P values (peak-to-peak values) $V_{PPA}$ through $V_{PPF}$ of the respective detection signals of the magnetic sensors A, B, C, D, E and F (steps S20 through S25 in FIG. 6) and judges whether the respective P—P values $V_{PPA}$ through $V_{PPF}$ have been stored or not (step S25a). When the P—P values $V_{PPA}$ through $V_{PPF}$ have been stored (YES in step S25a), the calculation processing circuit 10 compares the detected P—P values $V_{PPA}$ through $V_{PPF}$ with each other (step S26).

When the P—P values $V_{PPA}$ through $V_{PPF}$ have not been stored (NO in step S25a), the calculation processing circuit 10 returns the procedure.

Comparing the P—P values $V_{PPA}$ through $V_{PPF}$ (step S26), the calculation processing circuit 10 judges whether there is a P—P value $V_{PP}$ which is remarkably different from the others or not (step S27). When there is a P—P value $V_{PP}$ which is remarkably different from the others (YES in step S27), it is judged that the corresponding sensor is malfunctioning (step S28) and the procedure is returned. When there is no P—P value $V_{PP}$ which is remarkably different from the others (NO in step S27), the procedure is returned without performing any operation.

Figure 7:
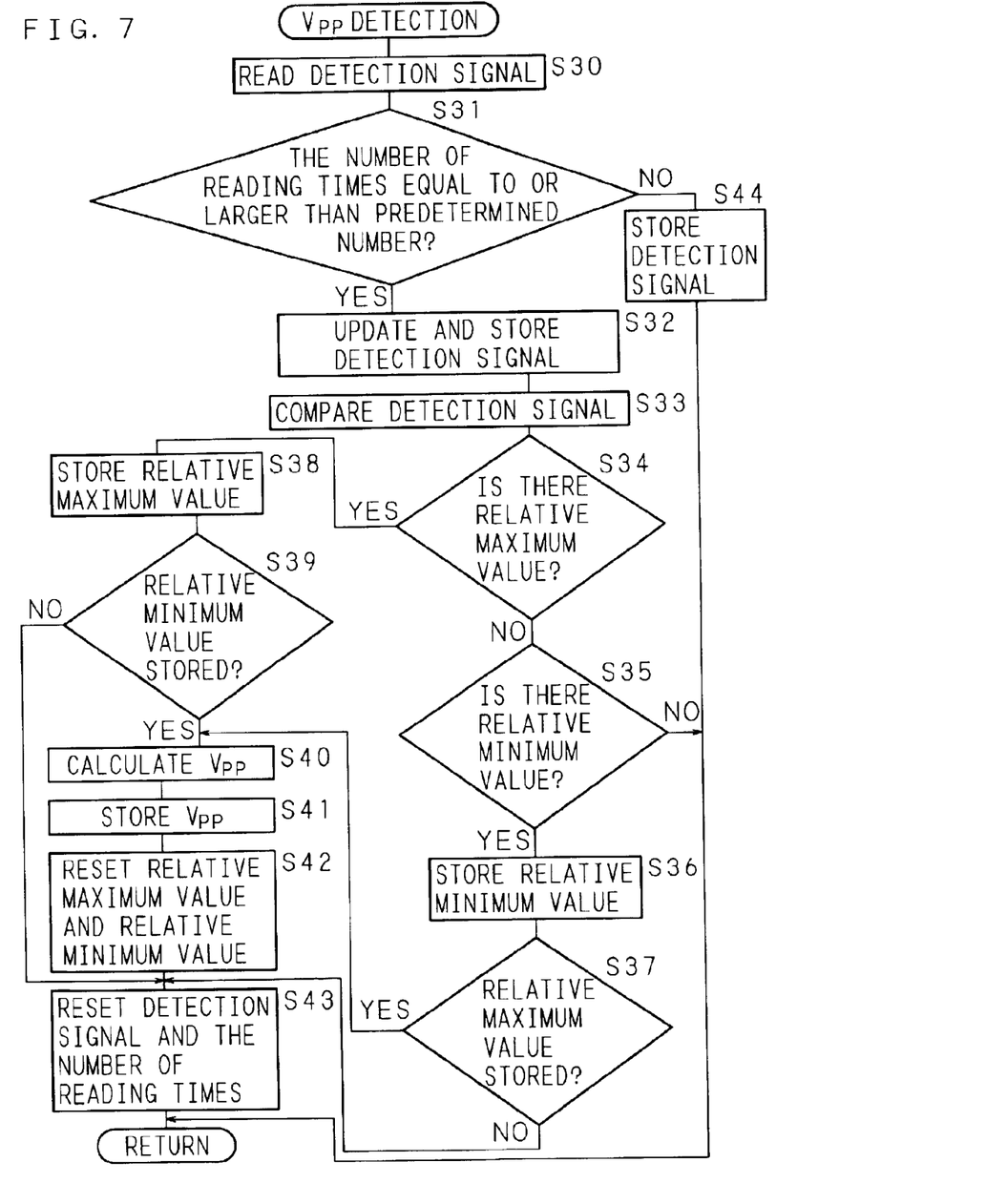
FIG. 7 is a flow chart showing an operation of a calculation processing circuit of an electric power steering apparatus according to the present invention.

For detecting the respective P—P values $V_{PPA}$ through $V_{PPF}$ of the respective detection signals of the magnetic sensors A, B, C, D, E and F (steps S20 through S25 in FIG. 6), the calculation processing circuit 10 first reads a detection signal of a magnetic sensor (step S30 in FIG. 7).

The calculation processing circuit 10 then judges whether the number of times (the number of sampling times) the detection signal of the magnetic sensor was read is equal to or larger than a predetermined value or not (step S31). When the number of times the signal was read is smaller than a predetermined value (NO in step S31), the calculation processing circuit 10 stores the detection signal read in step S30 (step S44) and returns the procedure.

When the number of times the detection signal of the magnetic sensor was read is equal to or larger than the predetermined value (YES in step S31), the calculation processing circuit 10 updates the predetermined number of sampled values of the stored detection signal to the predetermined number of the last sampled values of a detection signal including a value of the signal read in step S30 (step S32). The predetermined number of the last sampled values of the detection signal thus updated is then compared in chronological order (step S33).

Comparing the predetermined number of the last sampled values of the detection signal in chronological order (step S33), the calculation processing circuit 10 judges whether there is a local maximal value in the signal or not (step S34). When there is a local maximal value (YES in step S34), the calculation processing circuit 10 stores the local maximal value (step S38) and then determines whether a local minimal value is stored or not (step S39).

When a local minimal value is stored (YES in step S39), the calculation processing circuit 10 subtracts the local minimal value from the local maximal value stored in step S38 to calculate the P—P value $V_{PP}$ of the detection signal of the magnetic sensor (step S40) and stores the P—P value $V_{PP}$ (step S41).

After storing the calculated P—P value $V_{PP}$ (step S41), the calculation processing circuit 10 resets the local maximal value and the local minimal value of the detection signal of the magnetic sensor which have been stored (step S42), resets the detection signal of the magnetic sensor and the number of reading times which have been stored (step S43) and returns the procedure.

When the predetermined number of the last sampled values of the detection signal is compared (step S33) and it is judged that there is no local maximal value therein (NO in step S34) and there is a local minimal value therein (YES in step S35), the calculation processing circuit 10 stores the local minimal value (step S36) and then judges whether a local maximal value is stored or not (step S37).

When a local maximal value is stored (YES in step S37), the calculation processing circuit 10 subtracts the stored local minimal value (step S36) from the stored local maximal value to calculate the P—P value $V_{PP}$ of the detection signal of the magnetic sensor (step S40) and stores the P—P value $V_{PP}$ (step S41).

When no local maximal value is stored (NO in step S37), the calculation processing circuit 10 resets the detection signal of the magnetic sensor and the number of reading times which have been stored (step S43) and returns the procedure.

When there is no local maximal value (NO in step S34) and no local minimal value (NO in step S35) in the predetermined number of the last sampled values of the detection signal, the calculation processing circuit 10 returns the procedure without performing any operation.

Figure 8:
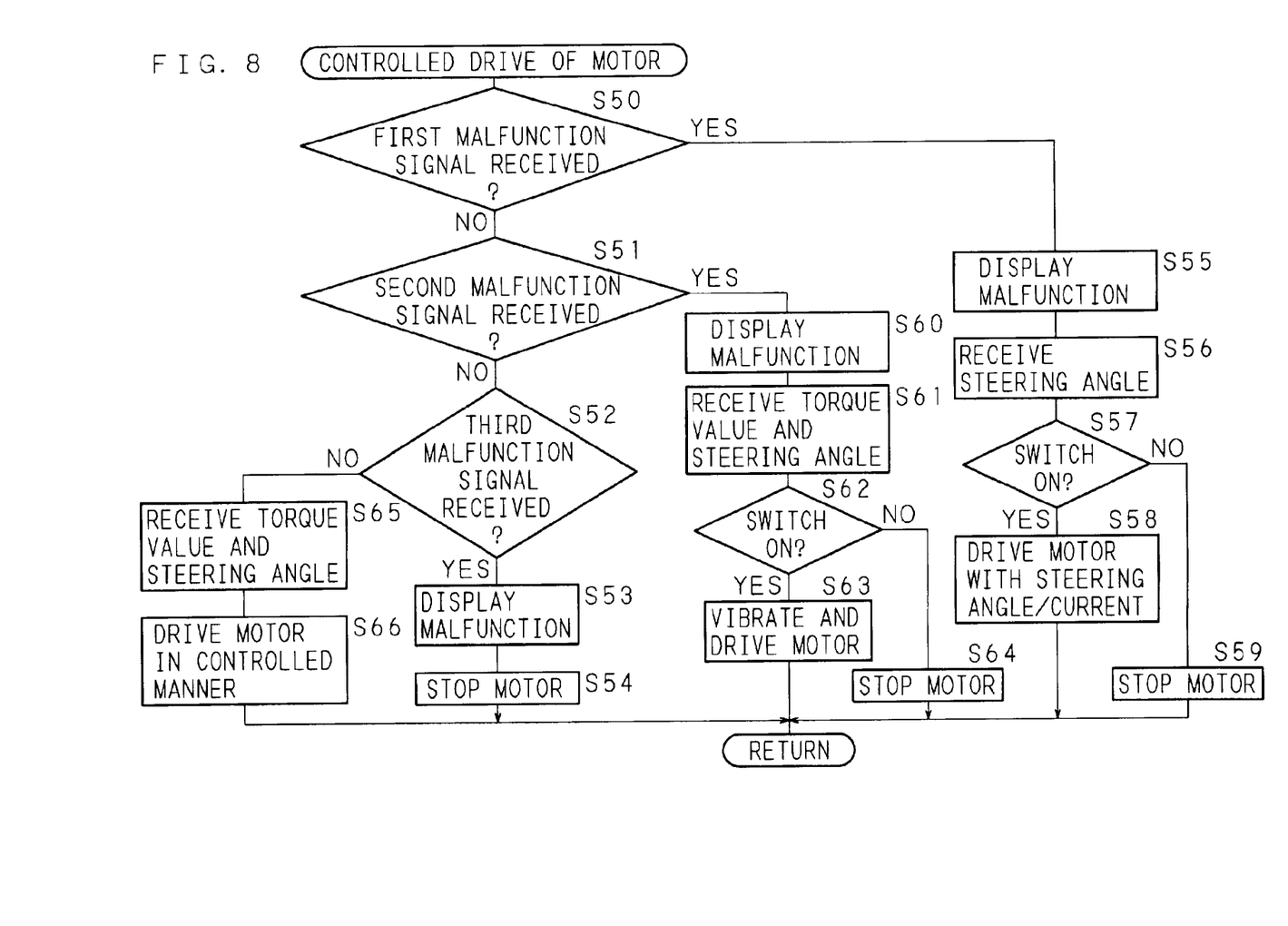
FIG. 8 is a flow chart showing an operation of a microcomputer of an electric power steering apparatus according to the present invention.

For driving the steering assist motor 24 in a controlled manner, the microcomputer 22 judges whether the microcomputer 22 has received a first malfunction signal (indicating a malfunction in one or both of the magnetic sensors A and B) from the calculation processing circuit 10 or not (step S50). When the microcomputer 22 has received the first malfunction signal (YES in step S50), the microcomputer 22 causes the display unit 25 to display a notice that a malfunction has occurred in the electric power steering (step S55).

The microcomputer 22 then receives an absolute steering angle detected by the magnetic sensors C, D, E and F (step S7 in FIG. 5) from the calculation processing circuit 10 (step S56) and judges whether the switch 23 is turned on or not (step S57). When the switch 23 is not turned on (NO in step S57), the microcomputer 22 causes the relay drive circuit 15 to turn off a relay contact of the fail-safe relay 15a to stop driving the steering assist motor 24 in a controlled manner (step S59) and returns the procedure.

When the switch 23 is turned on (YES in step S57), the microcomputer 22 drives the steering assist motor 24 in a controlled manner on the basis of the absolute steering angle received in step S56 and the steering angle/current table 18b (step S58) and returns the procedure.

Figure 9:
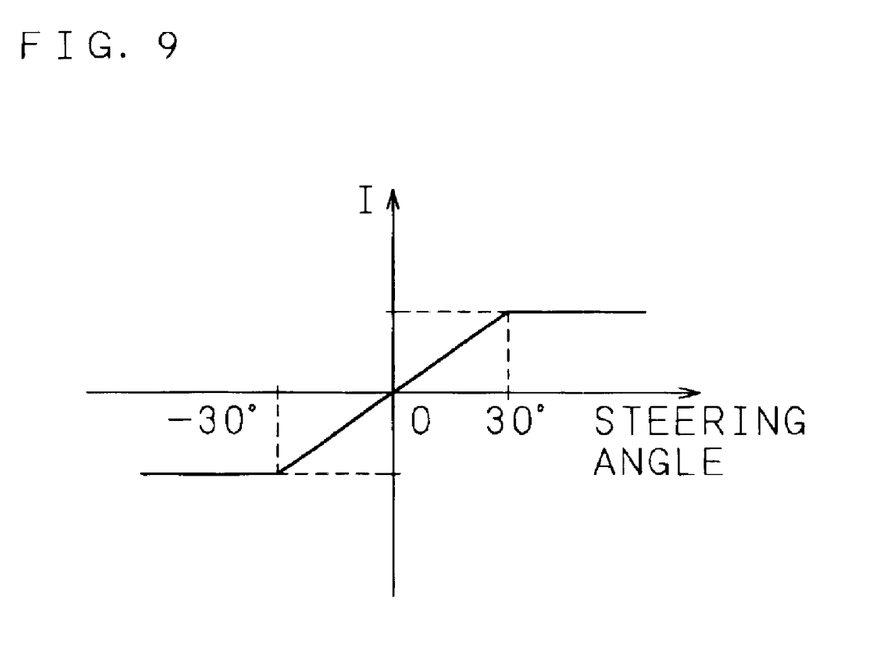
FIG. 9 is an explanatory view showing an example of a concept of a steering angle/current table.

For example, as shown in FIG. 9, the steering angle/current table 18b is prepared so as to increase a motor current I in accordance with the magnitude of the absolute steering angle when the absolute steering angle is within ±30° and make the motor current I constant when the absolute steering angle exceeds ±30°.

The microcomputer 22 judges whether the microcomputer 22 has received a second malfunction signal (indicating a malfunction in one of the magnetic sensors C, D, E and F) from the calculation processing circuit 10 or not (step S51). When the microcomputer 22 has received the second malfunction signal (YES in step S51), the microcomputer 22 causes the display unit 25 to display a notice that a malfunction has occurred in the electric power steering apparatus (step S60).

The microcomputer 22 then receives the torque value detected by the failure-mode process (step S10 in FIG. 5) and the absolute steering angle (step S11) from the calculation processing circuit 10 (step S61) and judges whether the switch 23 is turned on or not (step S62). When the switch 23 is not turned on (NO in step S62), the microcomputer 22 causes the relay drive circuit 15 to turn off the relay contact of the fail-safe relay 15a to stop driving the steering assist motor 24 in a controlled manner (step S64) and returns the procedure.

When the switch 23 is turned on (YES in step S62), the microcomputer 22 drives the steering assist motor 24 in a controlled manner on the basis of the torque value and absolute steering angle received in step S61 (step S63) and returns the procedure.

At this time, since the torque value received in step S61 is calculated by a failure mode, vibration is applied to the rotation of the steering assist motor 24. As a result, the steering member 1 rattles, notifying the driver of a malfunction in the electric power steering apparatus.

In other words, in order to notify the driver of a malfunction in the electric power steering apparatus, the microcomputer 22 applies vibration to the rotation of the steering assist motor 24 to cause the steering member 1 to rattle.

The microcomputer 22 judges whether the microcomputer 22 has received a third malfunction signal (indicating a malfunction in two or more of the magnetic sensors C, D, E and F) from the calculation processing circuit 10 or not (step S52). When the microcomputer 22 has received the third malfunction signal (YES in step S52), the microcomputer 22 causes the display unit 25 to display a notice that a malfunction has occurred in the electric power steering apparatus (step S53).

The microcomputer 22 then causes the relay drive circuit 15 to turn off the relay contact of the fail-safe relay 15a to stop driving the steering assist motor 24 in a controlled manner (step S54) and returns the procedure.

When the microcomputer 22 has not received the third malfunction signal from the calculation processing circuit 10 (NO in step S52), i.e., when no malfunction has occurred in any of the magnetic sensors, the microcomputer 22 receives the torque value and absolute steering angle detected normally (step S11 in FIG. 5) from the calculation processing circuit 10 (step S65), drives the steering assist motor 24 normally in a controlled manner on the basis of the received torque value, absolute steering angle and the torque/current table 18a (step S66) and returns the procedure.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A rotational angle detecting apparatus for detecting a rotational angle of a first rotor, comprising:

first targets provided at the first rotor;

second targets provided at a second rotor rotating coaxially with the first rotor;

two sensors, disposed opposite to the first targets for outputting detection signals having phases different from each other in accordance with each position of the first targets as the first rotor rotates;

two sensors, disposed opposite to the second targets for outputting detection signals having phases different from each other in accordance with each position of the second targets as the second rotor rotates;

a calculation processing circuit capable of performing operations of:

comparing the detection signals with each other which are output from either the two sensors disposed opposite to the first target or the two sensors disposed opposite to the second target, and judging whether any one of the sensors is malfunctioning or not on the basis of the comparison result; and a notifying unit for notifying a malfunction when the calculation processing circuit has judged that there is a malfunction.

2. The rotational angle detecting apparatus according to claim 1, wherein the calculation processing circuit corrects detection signals outputted from either of the two sensors disposed opposite to the first target or the two sensors disposed opposite to the second target on the basis of a difference in the phases of the detection signals and compares the corrected detection signal with the other detection signal.

3. A rotational angle detecting apparatus for detecting a rotational angle of a first rotor, comprising:

first targets provided at the first rotor;

second targets provided at a second rotor rotating coaxially with the first rotor;

two sensors, disposed opposite to the first targets for outputting detection signals having phases different from each other in accordance with each position of the first targets as the first rotor rotates;

two sensors, disposed opposite to the second targets for outputting detection signals having phases different from each other in accordance with each position of the second targets as the second rotor rotates; and a calculation processing circuit capable of performing operations of:
calculating a difference between a local maximal value and a local minimal value of each of the detection signals,
comparing the calculated differences in the respective detection signals with each other, and
judging whether any one of the sensors is malfunctioning or not on the basis of a comparison result.

4. A torque detecting apparatus for detecting a torque applied to a first shaft or a second shaft connected with the first shaft by a connection shaft, comprising:

a first rotor coaxially provided on the first shaft;

a second rotor coaxially provided on the second shaft;

first targets provided at the first rotor;

second targets provided at the second rotor;

two sensors, disposed opposite to the first targets for outputting detection signals having phases different from each other in accordance with each position of the first targets as the first rotor rotates;

two sensors, disposed opposite to the second targets for outputting detection signals having phases different from each other in accordance with each position of the second targets as the second rotor rotates;

a calculation processing circuit capable of performing operations of:
comparing the detection signals with each other which are output from either of the two sensors disposed opposite to the first target or the two sensors disposed opposite to the second target, and
judging whether any one of the sensors is malfunctioning or not on the basis of a comparison result; and a notifying unit for notifying a malfunction when the calculation processing circuit has judged that there is a malfunction.

5. The torque detecting apparatus according to claim 4, wherein the calculation processing circuit corrects one of the detection signals outputted from either of the two sensors disposed opposite to the first target or the two sensors disposed opposite to the second target on the basis of a difference in the phases of the detection signals and compares the corrected detection signal with the other detection signal.

6. A torque detecting apparatus for detecting a torque applied to a first shaft or a second shaft connected with the first shaft by a connection shaft, comprising:

a first rotor coaxially provided on the first shaft;

a second rotor coaxially provided on the second shaft;

first targets provided at the first rotor;

second targets provided at the second rotor;

two sensors, disposed opposite to the first targets for outputting detection signals having phases different from each other in accordance with each position of the first targets as the first rotor rotates;

two sensors, disposed opposite to the second targets for outputting detection signals having phases different from each other in accordance with each position of the second targets as the second rotor rotates; and a calculation processing circuit capable of performing operations of:
calculating a difference between a local maximal value and a local minimal value of each of the detection signals,
comparing the calculated differences in the respective detection signals with each other, and
judging whether any one of the sensors is malfunctioning or not on the basis of a comparison result.

* * * * *